US010102994B2

(12) United States Patent
Geier et al.

(10) Patent No.: US 10,102,994 B2
(45) Date of Patent: Oct. 16, 2018

(54) INTEGRAL CONTACT SOCKET FOR PLUG-IN CIRCUIT BREAKERS

(71) Applicant: SAFRAN ELECTRICAL & POWER, Blagnac (FR)

(72) Inventors: David Michael Geier, Punta Gorda, FL (US); James Michael McCormick, Bradenton, FL (US); Peter Nerstrom, Sarasota, FL (US); Jeffrey Alan Muckefuse, Bradenton, FL (US)

(73) Assignee: SAFRAN ELECTRICAL & POWER, Blagnac (FR)

(*) Notice: Subject to any disclaimer, the term of this patent is extended or adjusted under 35 U.S.C. 154(b) by 6 days.

(21) Appl. No.: 15/488,889

(22) Filed: Apr. 17, 2017

(65) Prior Publication Data
US 2017/0301499 A1 Oct. 19, 2017

Related U.S. Application Data

(60) Provisional application No. 62/324,376, filed on Apr. 19, 2016.

(51) Int. Cl.
*H01H 71/12* (2006.01)
*H01R 13/426* (2006.01)
(Continued)

(52) U.S. Cl.
CPC .......... *H01H 71/12* (2013.01); *H01H 1/5866* (2013.01); *H01H 71/08* (2013.01);
(Continued)

(58) Field of Classification Search
CPC ...... H01H 71/12; H01H 1/5866; H01H 71/08; H01H 73/08; H01R 13/111; H01R 13/187; H01R 13/426; H02B 1/056
(Continued)

(56) References Cited

U.S. PATENT DOCUMENTS 3,358,099 A * 12/1967 De Bellomayre ....... H01H 5/04
200/308
4,329,669 A 5/1982 Krasser et al.
(Continued)

FOREIGN PATENT DOCUMENTS

EP 1507275 2/2005
JP 2002-237248 8/2002
WO 2015/084711 6/2015

OTHER PUBLICATIONS

International Search Report and Written Opinion dated Oct. 20, 2017, 18 pages.
(Continued)

*Primary Examiner* — Anatoly Vortman
*Assistant Examiner* — Jacob Crum
(74) *Attorney, Agent, or Firm* — Rankin, Hill & Clark LLP

(57) ABSTRACT

A circuit breaker includes a housing, separable contacts, a trip mechanism, a first terminal member, and a second terminal member. The separable contacts are received in the housing and include a first contact and a second contact. At least one of the contacts is moveable with respect to the other to open and close the separable contacts. The trip mechanism can include a bimetal strip and selectively open the separable contacts. The first terminal member includes a first socket configured to receive a pin located on an associated bus structure. The first terminal member is electrically connected with the first contact. The second terminal member includes a second socket configured to receive another pin located on the associated bus structure. The second terminal can contact the bimetal strip and is electrically connected with the second contact. The first and second sockets can be received in the housing.

20 Claims, 3 Drawing Sheets

(51) Int. Cl.
*H01R 13/11* (2006.01)
*H01H 1/58* (2006.01)
*H01H 71/08* (2006.01)
*H01H 73/08* (2006.01)
*H02B 1/056* (2006.01)

(52) U.S. Cl.
CPC ........... *H01H 73/08* (2013.01); *H01R 13/111* (2013.01); *H01R 13/426* (2013.01); *H02B 1/056* (2013.01)

(58) Field of Classification Search
USPC .................................................. 337/14, 253
See application file for complete search history.

(56) References Cited

U.S. PATENT DOCUMENTS

| | | | |
|---|---|---|---|
| 4,387,945 A * | 6/1983 | MacAvoy | H01R 13/426 439/595 |
| 5,378,552 A * | 1/1995 | Dixon, Jr. | B60L 3/0007 429/1 |
| 5,981,893 A * | 11/1999 | Bleiker | H01H 1/38 218/123 |
| 6,274,833 B1 | 8/2001 | Moody | |
| 6,315,580 B1 | 11/2001 | Hurtubise et al. | |
| 6,864,446 B1 | 3/2005 | Mills | |
| 7,021,957 B2 | 4/2006 | Sweetland et al. | |
| 7,570,146 B2 | 8/2009 | Mills et al. | |
| 8,094,436 B2 | 1/2012 | Mills et al. | |
| 9,720,044 B2 | 8/2017 | Mills et al. | |
| 2006/0061439 A1 | 3/2006 | Schalk et al. | |
| 2010/0068941 A1* | 3/2010 | Yang | H01R 13/426 439/655 |
| 2011/0028051 A1* | 2/2011 | Heigl | H01R 13/111 439/736 |
| 2011/0235244 A1* | 9/2011 | Mills | H02B 1/056 361/656 |
| 2015/0079854 A1 | 3/2015 | Mills et al. | |
| 2015/0153414 A1 | 6/2015 | Mills et al. | |

OTHER PUBLICATIONS

U.S. Office Action dated Oct. 23, 2017 from corresponding U.S. Appl. No. 15/591,342, 14 pages.

* cited by examiner

INTEGRAL CONTACT SOCKET FOR PLUG-IN CIRCUIT BREAKERS

BACKGROUND

Circuit breakers used in aircraft electrical systems provide overcurrent protection, and also may serve as switches for turning equipment on and off. In such a circuit breaker, a push-pull handle on the circuit breaker is moved from an inward position outward to open a corresponding load circuit. This action may either be manual or automatic in the event of an overload or fault condition. When the push-pull handle is moved from the outward position inwardly, the load circuit is reenergized.

With reference to FIG. 1, one type of circuit breaker used in aircraft electrical systems is a plug-in circuit breaker 10. The plug-in circuit breaker 10 includes a push-pull handle 12 similar to what was described above. The aircraft electrical system includes a bus structure 14 on which a plurality of pins 16 (only two are shown in FIG. 1) are provided. The known plug-in circuit breaker 10 includes two sockets 18, and each socket 18 receives a respective pin 16 disposed on the bus structure 14. One of the sockets acts as a line terminal for the plug-in circuit breaker 10 and the other socket operates as a load terminal. In this known plug-in circuit breaker 10, each of the sockets 18 is brazed or welded onto a respective terminal (not visible) located in a housing 20 of the plug-in circuit breaker 10. Although this form of connection works adequately, brazing the socket to the respective terminal requires multiple processes and steps, which can be costly or cumbersome.

SUMMARY

In view of the foregoing, a circuit breaker is provided that includes a housing, separable contacts, a trip mechanism, a first terminal member, and a second terminal member. The separable contacts are received in the housing and include a first contact and a second contact. At least one of the contacts is moveable with respect to the other to open and close the separable contacts. The trip mechanism includes a bimetal strip received in the housing. The trip mechanism is operatively connected with at least one of the first and second contacts to selectively open the separable contacts. The first terminal member includes a first socket configured to receive a pin located on an associated bus structure. The first terminal member is electrically connected with the first contact. The second terminal member includes a second socket configured to receive another pin located on the associated bus structure. The second terminal contacts the bimetal strip and is electrically connected with the second contact.

Another example of a circuit breaker includes a housing, separable contacts, a trip mechanism, a first terminal member, and a second terminal member. The separable contacts are received in the housing and include a first contact and a second contact. At least one of the contacts is moveable with respect to the other to open and close the separable contacts. The trip mechanism is operatively connected with the separable contacts to selectively open the separable contacts. The first terminal member includes a first socket positioned in the housing and configured to receive a pin located on an associated bus structure. The first terminal member is electrically connected with the first contact. The second terminal member includes a second socket positioned in the housing and configured to receive another pin located on the associated bus structure. The second terminal is electrically connected with the second contact.

DETAILED DESCRIPTION

Figure 2:
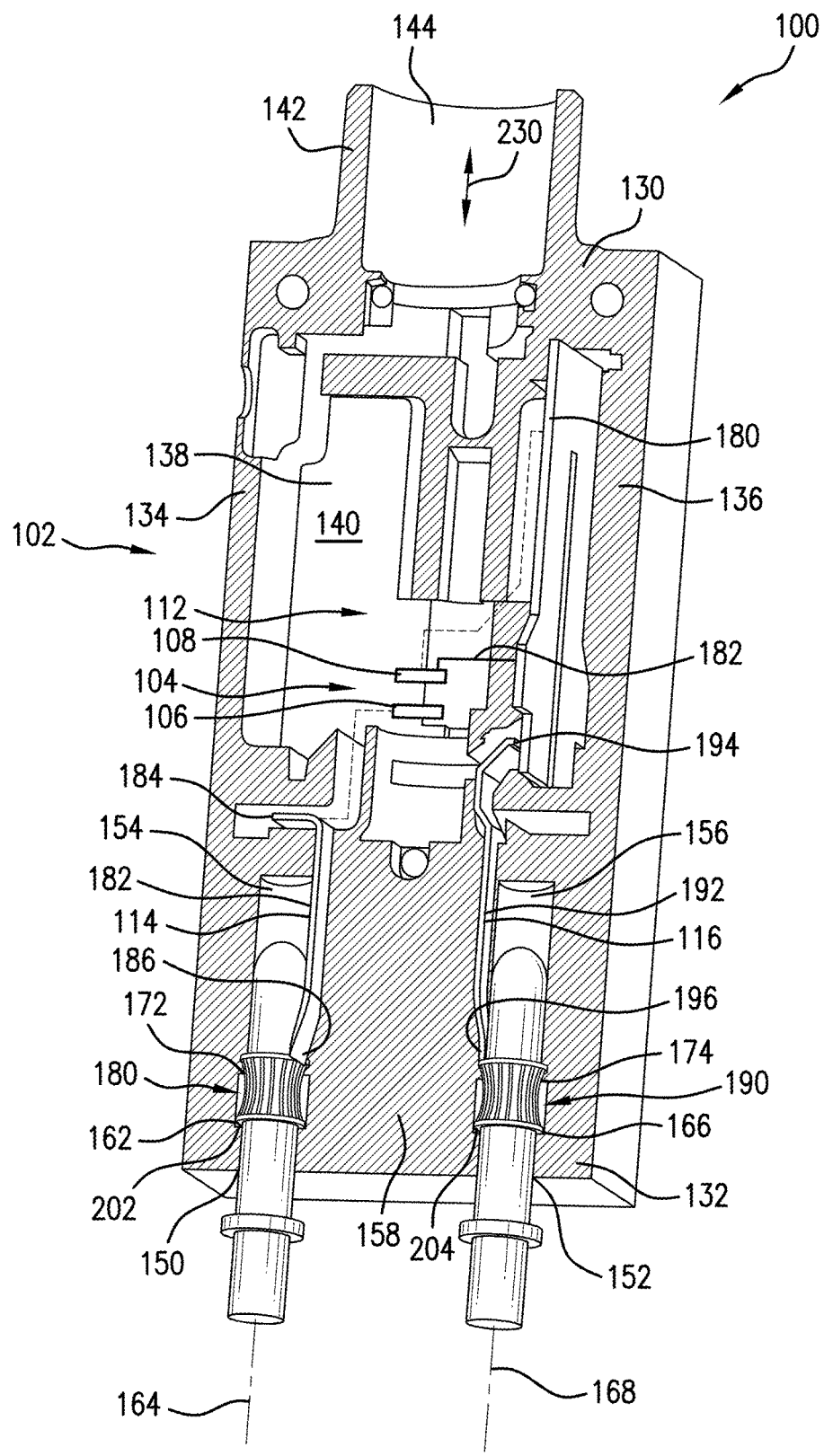
FIG. 2 is a schematic cross-sectional view of a circuit breaker with an integral contact socket.

FIG. 2 depicts components of a circuit breaker 100 with an integral contact socket. The circuit breaker 100 includes a housing 102 and separable contacts 104 (schematically depicted in FIG. 2) received in the housing 102. In the illustrated embodiment, the separable contacts include a first contact 106, which is fixed in the housing 102, and a second contact 108, which is moveable. As such, at least one of the first contact 106 and the second contact 108 is moveable with respect to the other, and in this instance, the second contact 108 is moveable with respect to the first contact 106, to open and close the separable contacts 104.

The circuit breaker 100 also includes a trip mechanism 112 (depicted schematically in FIG. 2) operatively connected with at least one of the first and second contacts 106, 108 to selectively open the separable contacts 104. A first terminal member 114 is electrically connected with the first contact 106, and a second terminal member 116 is connected with the second contact 108.

Figure 3:
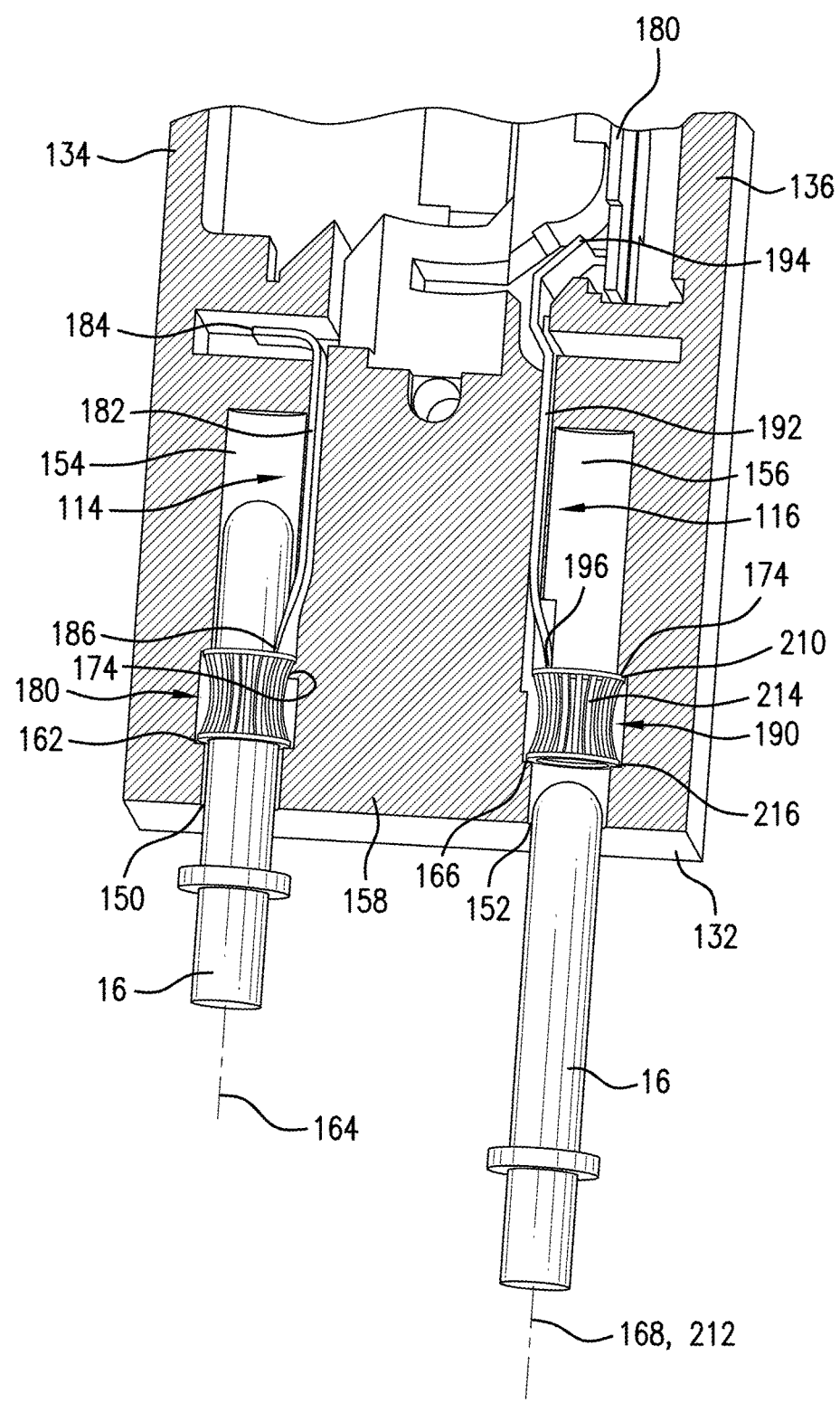
FIG. 3 is a close-up view of the lower section of the circuit breaker shown in FIG. 2 with a pin removed from the circuit breaker.

The housing 102 is made from an electrically insulative material. The housing 102 includes an upper wall 130 and a lower wall 132. The housing 102 also includes a plurality of sidewalls such as a left side wall 134, a right side wall 136, a rear wall 138, and a forward wall, which is not visible in FIGS. 2 and 3. The upper wall 130, the lower wall 132, and the plurality of sidewalls 134, 136, 138 define at least one cavity 140. A plurality of cavities and passages, some of which are described in more detail below, are provided in the illustrated housing 102. For example, the at least one cavity 140 can include pin receiving passages 154, 156 that will be described in more detail hereinafter. A bushing 142 extends upwardly from the upper wall 130 and defines an actuator opening 144 that leads to the at least one cavity 140.

The housing 102 includes a first pin receiving hole 150 provided in the lower wall 132 and a second pin receiving hole 152 provided in the lower wall 132. The housing 102 includes the first pin receiving passage 154 extending into the housing 102 from the first pin receiving hole 150 and the second pin receiving passage 156 extending into the housing 102 from the second pin receiving hole 152. The pin receiving holes 150, 152 and the pin receiving passages 154, 156 receive pins 16 similar to the manner in which the sockets 18 receive the pins 16 in the known circuit breaker 10 shown in FIG. 1. The housing 102 includes an insulative section 158 interposed between and separating the first pin receiving passage 154 from the second pin receiving passage 156. A first lower shelf surface 162, which is normal to a longitudinal axis 164 of the first pin receiving passage 154, is provided in the first pin receiving passage 154. A second lower shelf surface 166, which is normal to a longitudinal axis 168 of the second pin receiving passage 156, is provided in the second pin receiving passage 156. A first upper socket retainer 172 extends inwardly toward the longitudinal axis 164 of the first pin receiving passage 154. Similarly, a second upper socket retainer 174 extends inwardly toward the longitudinal axis 168 of the second pin receiving passage 156.

The trip mechanism 112 is operatively connected with at least one of the first and second contacts 106, 108, and in the depicted embodiment is operatively connected with the second contact 108. The trip mechanism 112 selectively opens separable contacts 104 in the event of an overload or fault condition. The trip mechanism 112 can include a bimetal strip 180 that is operatively connected with the second contact 108 through a linkage 182 (depicted schematically in FIG. 2). The bimetal strip 180 and the linkage 182 can be conventional.

With reference to FIG. 2, the first terminal member 114 and the second terminal member 116 are made of metal so as to be electrically conductive. The first terminal member 114 includes a socket, which will be referred to as a first socket 180, and a strip, which will be referred to as a first strip 182. The first strip 182 extends upwardly from the first socket 180 toward the first contact 106, and the first terminal member 114 is electrically connected with the first contact 106. A first (upper) end 184 of the first strip 182 is positioned outside of the first pin receiving passage 154 and nearer to the first contact 106 as compared to a second (lower) end 186 of the first strip 182. The second (lower) end 186 of the first strip 182 contacts and connects with the first socket 180. The first strip 182 can be bent in between the first end 184 and the second end 186 to fit in the housing 102.

The second terminal member 116 includes a socket, which will be referred to as a second socket 190, and a strip, which will be referred to as a second strip 192. The second strip 192 extends upwardly from the second socket 190 toward the separable contacts 104. The second terminal member 116 is electrically connected with the bimetal strip 180, which is electrically connected with the second contact 108. A first (upper) end 194 of the second strip 192 is positioned outside of the second pin receiving passage 156 and contacts the bimetal strip 180, which eliminates the need found in known circuit breakers for a standalone socket, terminal and conductive strap from the terminal to the bimetal strip. A second (lower) end 196 of the second strip 192 contacts and connects with the second socket 190. The second strip 192 can be bent in between the first end 194 and the second end 196 to fit in the housing 102.

The first socket 180 and the second socket 190 are positioned within the housing 102. More particularly, the first socket 180 and the second socket 190 are positioned within the housing 102 below the upper wall 130 and above the lower wall 132. The first socket 180 is positioned above and offset along the longitudinal axis 164 of the first pin receiving passage 154 from the first pin receiving hole 150. The second socket 190 is positioned above and offset along the longitudinal axis 168 of the second pin receiving passage 156 from the second pin receiving hole 152. A lower end 202 of the first socket 180 contacts the first lower shelf surface 162. A lower end 204 of the second socket 190 contacts the second lower shelf surface 166. An upper section of the first socket 180 is engaged by the first upper socket retainer 172. An upper section of the second socket 190 is engaged by the second upper socket retainer 174.

The first socket 180 can be, and in the illustrated embodiment is, identical to the second circuit 190. Accordingly, the second socket 190 will be described with particularity with reference to FIG. 3 with the understanding that the first socket 180 includes the same elements. The second socket 190 includes a ring, which can be a first (upper) ring 210, surrounding and centered with respect to a central socket axis 212, which in the illustrated embodiment is coaxial with the longitudinal axis 168 of the second pin receiving passage 156, and a plurality of columns 214 extending from the first ring 210. The columns 214 are circumferentially spaced around the first ring 210 and each column 214 is offset from the central socket axis 212. Each column 214 bends inwardly toward the central socket axis 212. The second socket 190 in the illustrated embodiment includes the first ring 210 and a second (lower) ring 216 spaced from the first ring 210 along the longitudinal axis 168 of the second pin receiving passage 156. The plurality of columns 214 connect the first ring 210 with the second ring 216. Each column 214 bends inwardly toward the central socket axis 212 such that a central inner diameter of the second socket 190 at a central location between the first ring 210 and the second ring 216 is smaller than an inner diameter of the first ring 210 or the second ring 216.

Figure 1:
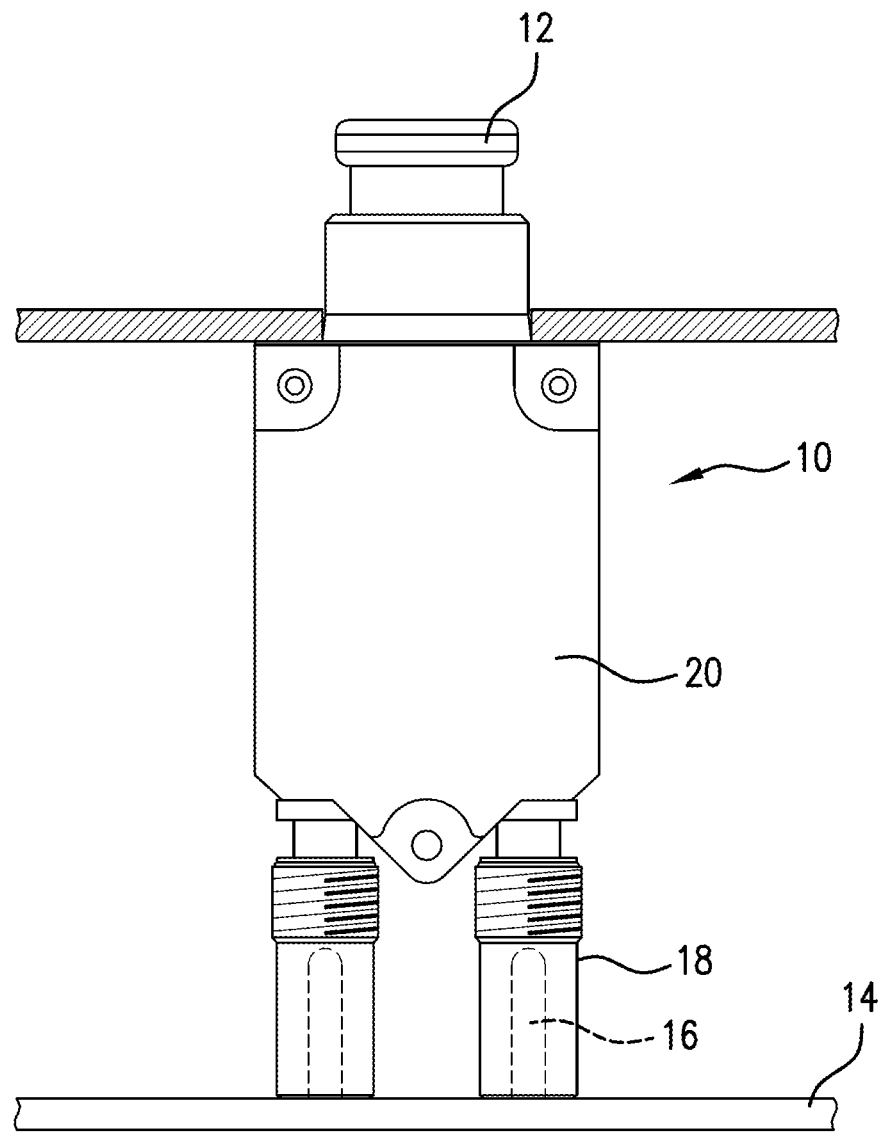
FIG. 1 is a schematic side view of a known plug-in circuit breaker.

The circuit breaker 100 also includes a manual actuator (not shown in FIGS. 2-5), which is similar to the manual actuator depicted in FIG. 1. The manual actuator translates along an actuator axis 230 to open and close the separable contacts 104 similar to known manual actuators. The manual actuator is operatively connected with the linkage 182, or a similar linkage, operatively connected to the bimetal strip 180. The actuator axis 230 is parallel with the longitudinal axis 164 of the first pin receiving passage 154 and the longitudinal axis 168 of the second pin receiving passage 156.

In use, the circuit breaker 100 with an integral contact socket operates similarly to the known circuit breaker 10 shown in FIG. 1. In contrast, the first socket 180 and the second socket 190 are positioned within the housing 102. As such, the pins 16 are received in the pin receiving passages 154, 156, respectively. One of the pins 16 is received in the first socket 180 and another of the pons 16 is received in the second socket 190. Also, one of the terminal members, in the illustrated embodiment the second terminal member 116, can contact the bimetal strip 180 of the trip mechanism obviating the need for a standalone socket, terminal and conductive strap from the terminal to the bimetal strip.

A circuit breaker with an integral contact socket has been described above in particularity. Modifications and alternations will occur to those upon reading and understanding the preceding detail description. The invention, however, is not limited to only the embodiment described above. Instead, the invention is broadly defined by the appended claims and the equivalents thereof.

The invention claimed is:
1. A circuit breaker comprising:
a housing that includes a first pin receiving passage and a second pin receiving passage;
separable contacts received in the housing including a first contact and a second contact, at least one of the first contact and the second contact being movable with respect to the other of the first contact and the second contact to open and close the separable contacts;
a trip mechanism including bimetal strip received in the housing, the trip mechanism being operatively connected with at least one of the first and second separable contacts to selectively open the separable contacts;
a first terminal member including a first socket and a first strip, the first socket configured to receive a pin located on an associated bus structure, wherein the first strip includes an upper end positioned outside of the first pin receiving passage that electrically contacts the first contact and a lower end within the first pin receiving passage that electrically contacts the first socket; and a second terminal member including a second socket and a second strip, the second socket configured to receive another pin located on the associated bus structure, wherein the second strip includes a first end positioned outside of the second pin receiving passage that electrically contacts the bimetal strip and a second end within the second pin receiving passage that electrically contacts the second socket.

2. The circuit breaker of claim 1, wherein the first socket and the second socket are positioned within the housing.

3. The circuit breaker of claim 1, wherein the housing includes an upper wall and a lower wall, wherein the first socket and the second socket are positioned within the housing below the upper wall and above the lower wall.

4. The circuit breaker of claim 3, wherein the housing includes a first pin receiving hole provided in the lower wall and a second pin receiving hole provided in the lower wall.

5. The circuit breaker of claim 4, wherein the first socket is positioned above and offset from the first pin receiving hole, wherein the second socket is positioned above and offset from the second pin receiving hole.

6. The circuit breaker of claim 4, wherein the first pin receiving passage extends into the housing from the first pin receiving hole and the second pin receiving passage extends into the housing from the second pin receiving hole, and wherein the housing includes an insulative section interposed between and separating the first pin receiving passage from the second pin receiving passage.

7. The circuit breaker of claim 6, wherein a first lower shelf surface, which is normal to a longitudinal axis of the first pin receiving passage, is provided in the first pin receiving passage, and a lower end of the first socket contacts the first lower shelf surface, and a second lower shelf surface, which is normal to a longitudinal axis of the second pin receiving passage, is provided in the second pin receiving passage, and a lower end of the second socket contacts the second lower shelf surface.

8. The circuit breaker of claim 1, wherein each socket includes a ring surrounding and centered with respect to a central socket axis and a plurality of columns extending from the ring.

9. The circuit breaker of claim 8, wherein each column is aligned parallel with and offset from the central socket axis.

10. The circuit breaker of claim 1, wherein the housing includes an upper wall and a lower wall opposite one another and a plurality of side walls that extend therebetween so as to define at least one cavity that entirely contains the first socket and the second socket that each include a ring surrounding and centered with respect to a central socket axis and a plurality of columns extending from the ring so as to be parallel with and offset from the central socket axis and each column bends inwardly toward the central socket axis.

11. The circuit breaker of claim 9, wherein each socket includes a first ring and a second ring spaced from the first ring along the longitudinal axis, wherein the plurality of columns connect the first ring with the second ring.

12. The circuit breaker of claim 11, wherein each column bends inwardly toward the central socket axis such that a central inner diameter of the socket at a central location between the first ring and the second ring is smaller than an inner diameter of the first ring or the second ring.

13. A circuit breaker comprising:

a housing that includes a first pin receiving passage and a second pin receiving passage;

separable contacts received in the housing including a first contact and a second contact, at least one of the first contact and the second contact being movable with respect to the other of the first contact and the second contact to open and close the separable contacts;

a trip mechanism operatively connected with the separable contacts to selectively open the separable contacts;

a first terminal member including a first socket and a first strip, the first socket positioned in the housing and configured to receive a pin located on an associated bus structure, wherein the first strip includes an upper end positioned outside of the first pin receiving passage that contacts the first contact and a lower end within the first pin receiving passage that contacts the first socket; and a second terminal member including a second socket and a second strip, the second socket positioned in the housing and configured to receive another pin located on the associated bus structure, wherein the second strip includes a first end positioned outside of the second pin receiving passage that electrically contacts the trip mechanism and a second end within the second pin receiving passage that contacts the second socket.

14. The circuit breaker of claim 13, wherein the housing includes an upper wall, a lower wall and a plurality of side walls extending between the upper wall and the lower wall to define at least one cavity, wherein the first socket and the second socket are positioned in the at least one cavity.

15. The circuit breaker of claim 14, wherein the housing includes a first pin receiving hole provided in the lower wall and a second pin receiving hole provided in the lower wall.

16. The circuit breaker of claim 15, wherein the first socket is positioned above and offset from the first pin receiving hole, wherein the second socket is positioned above and offset from the second pin receiving hole.

17. The circuit breaker of claim 16, wherein the first pin receiving passage extends into the housing from the first pin receiving hole and the second pin receiving passage extends into the housing from the second pin receiving hole, wherein the housing includes an insulative section interposed between and separating the first pin receiving passage from the second pin receiving passage.

18. The circuit breaker of claim 13, wherein trip mechanism includes a bimetal strip received in the housing, wherein the first terminal member contacts the bimetal strip.

19. The circuit breaker of claim 13, wherein the housing includes an upper wall and a lower wall opposite one another and a plurality of side walls that extend therebetween so as to define at least one cavity that entirely contains the first socket and the second socket that each include a ring surrounding and centered with respect to a central socket axis and a plurality of columns extending from the ring, wherein each column is aligned parallel with and offset from the central socket axis.

20. The circuit breaker of claim 19, wherein each socket includes a first ring and a second ring spaced from the first ring along the longitudinal axis, wherein the plurality of columns connect the first ring with the second ring, wherein each column bends inwardly toward the central socket axis such that a central inner diameter of the socket at a central location between the first ring and the second ring is smaller than an inner diameter of the first ring or the second ring.

* * * * *